Dec. 29, 1970  F. FELLER  3,551,080
ROTARY PISTON ENGINE COMPRISING FLUID BIASED VANE SEALS
Filed Jan. 29, 1969  4 Sheets-Sheet 1
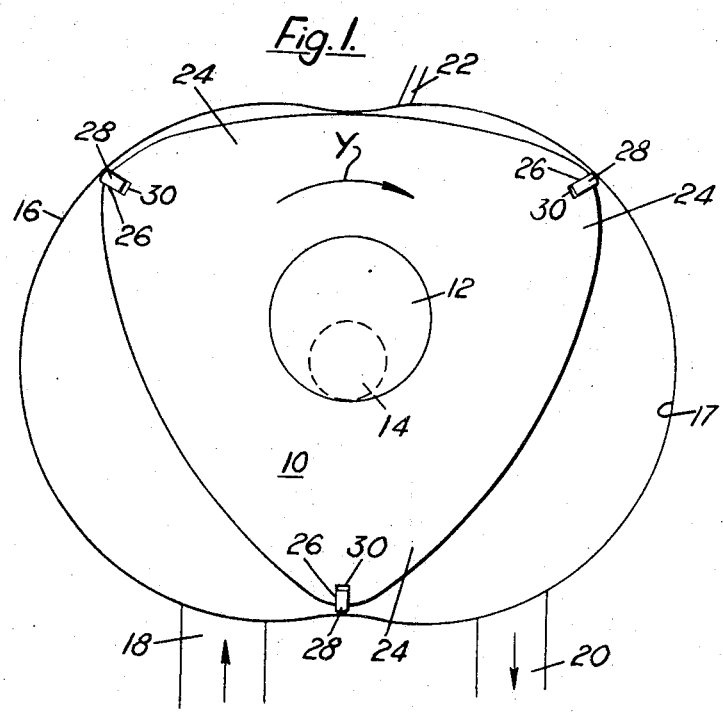
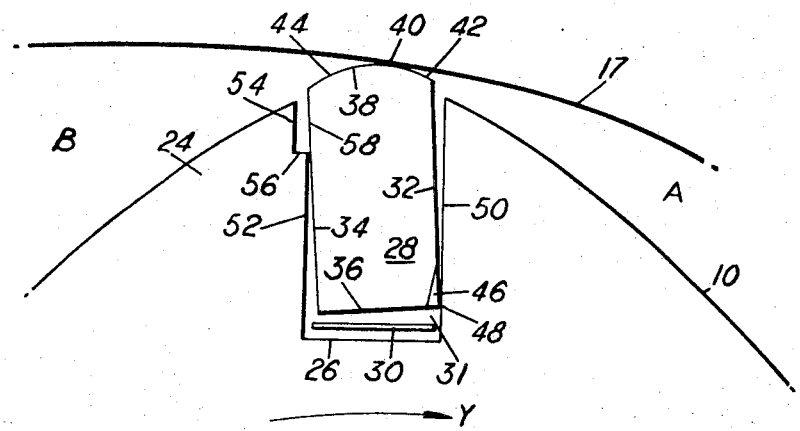
Inventor
FRITZ FELLER
By
Cushman, Darby & Cushman
Attorneys

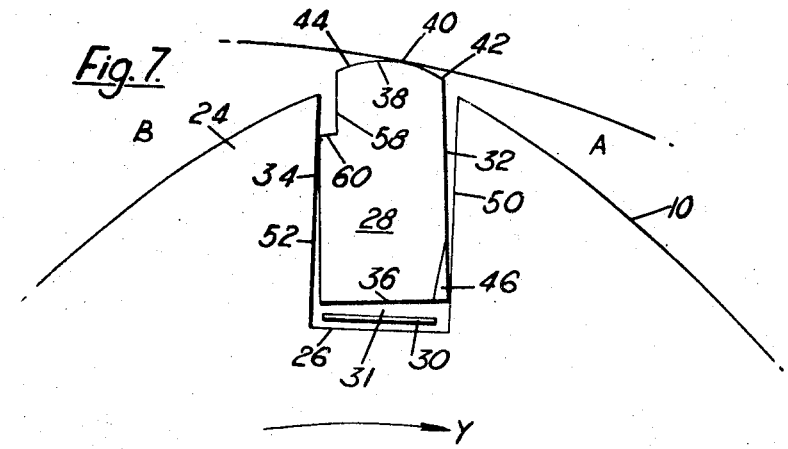
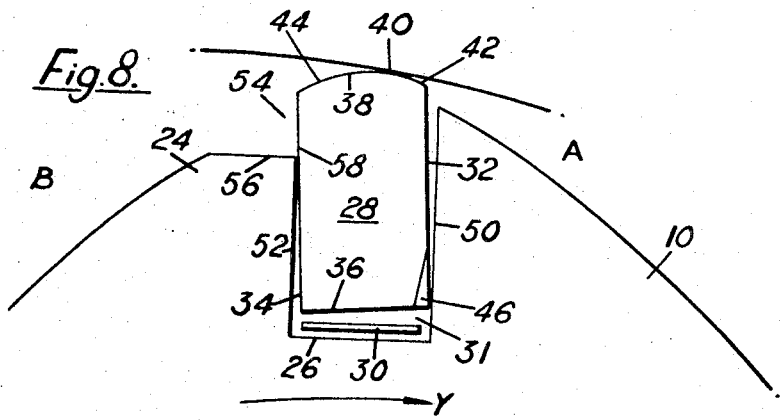
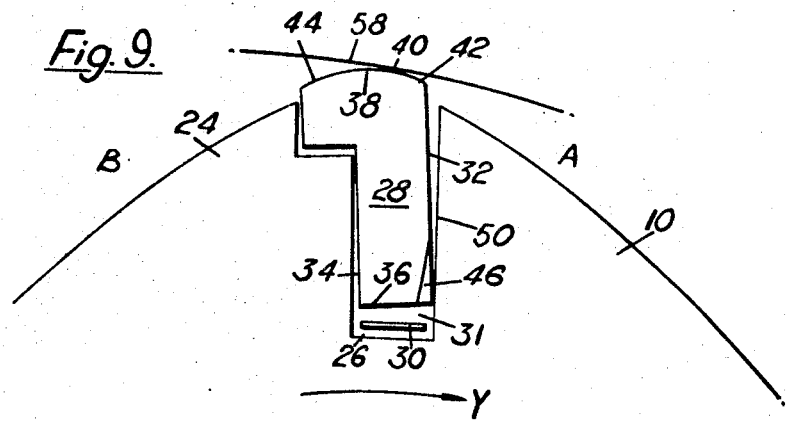

United States Patent Office 3,551,080
Patented Dec. 29, 1970

3,551,080
ROTARY PISTON ENGINE COMPRISING FLUID BIASED VANE SEALS
Fritz Feller, Wistaston, Crewe, England, assignor to Rolls-Royce Limited, Derby, England, a British company
Filed Jan. 29, 1969, Ser. No. 794,936
Claims priority, application Great Britain, Feb. 13, 1968, 7,019/68
Int. Cl. F02b 53/00; F01c 19/00
U.S. Cl. 418—124
5 Claims

ABSTRACT OF THE DISCLOSURE

A rotary piston engine of the type having a three-sided piston rotatable in a two-lobed substantially epitrochoidal housing, the piston being provided with sealing strips located in grooves in the apices of the piston. The arrangement of the grooves and sealing strips in the piston is such that high pressure working fluid from the working chambers of the engine is conducted to the radially inner surfaces of the sealing strips within their respective grooves so as to urge them radially outwards at all times.

This invention relates to rotary piston machines, such as pumps, compressors and internal combustion engines, of the type comprising a housing, a shaft extending axially of the housing and a piston rotatable in a planetary fashion within the housing about an eccentric provided on the shaft, the piston having in its periphery at least one axially extending groove containing a radially movable sealing member which is adapted to be urged into contact with the internal peripheral surface of the housing so as to define a plurality of working chambers therein. Such a rotary piston machine will hereinafter be referred to as a rotary piston machine of the type specified.

The invention is more particularly, but not exclusively, concerned with a rotary piston internal combustion engine having a three-sided piston rotatable within a housing having a two-lobed substantially epitrochoidal internal peripheral surface.

In a rotary piston machine of the type specified, the sealing member has a surface facing the direction of rotation of the piston, which surface will hereinafter be referred to as the leading side of the sealing member, and another surface facing away from the direction of rotation of the piston, which other surface will hereinafter be referred to as the trailing side of the sealing member.

According to the present invention, in a rotary piston machine of the type specified there is provided means for admitting fluid from the working chamber on the trailing side of the sealing member to that portion of the groove beneath the radially inner surface of the sealing member when the fluid pressure in the working chamber on the trailing side of the sealing member exceeds the fluid pressure in the working chamber on the leading side of the sealing member by a predetermined amount, so as to urge the sealing member radially outwards, and means for preventing the fluid thus admitted from entering the working chamber on the leading side of the sealing member.

In a rotary piston machine of the type specified, the width of the groove, measured circumferentially of the piston, is usually slightly greater than the width of the sealing member between its leading and trailing sides so as to permit the sealing member to rock about its axis therein between a first or trailing position and a second or leading position. When this is the case, the arrangement of the groove and the sealing member is preferably such that the area of that part of the trailing side of the sealing member exposed to the fluid in the working chamber on the trailing side of the sealing member, when the sealing member is in the trailing position is effectively increased relative to the area of that part of the leading side of the sealing member exposed to the fluid in the working chamber on the leading side of the sealing member, whereby when the fluid pressure in the working chamber on the trailing side of the sealing member exceeds the fluid pressure in the working chamber on the leading side of the sealing member by the predetermined amount, the sealing member moves about its axis in the groove from the trailing position to the leading position so as to admit the fluid from the working chamber on the trailing side of the sealing member to that portion of the groove beneath the radially inner surface of the sealing member and to prevent the fluid thus admitted from entering the working chamber on the leading side of the sealing member.

Thus a recess may be provided in the radially outer portion of the wall of the groove on the trailing side of the sealing member so as to increase the width of the radially outer part of the groove over its entire length, into which recess a radially outer portion of the sealing member may partly extend, or a recess may be provided in the radially outer portion of the trailing side of the sealing member so as to reduce the width of the radially outer part of the sealing member over its entire length.

Alternatively, the height of the wall of the groove on the trailing side of the sealing member may be reduced.

In a preferred embodiment of the invention there also is provided means for admitting fluid from the working chamber on the leading side of the sealing member to that portion of the groove beneath the radially inner surface of the sealing member when the fluid pressure in the working chamber on the trailing side of the sealing member does not exceed the fluid pressure in the working chamber on the leading side of the sealing member by the predetermined amount, so as to urge the sealing member radially outwards, and means for preventing the fluid thus admitted from entering the working chamber on the trailing side of the sealing member.

Where the sealing member is free to rock about its axis in the groove as hereinbefore described, the means for admitting fluid from the working chamber on the leading side of the sealing member to that portion of the groove beneath the radially inner surface of the sealing member preferably comprises at least one slot provided in the radially inner edge of the leading side of the sealing member.

The invention also comprises a rotary piston internal combustion engine in accordance with any of the preceding statements of invention, having a three-sided piston rotatable within a housing having a two-lobed substantially epitrochoidal internal peripheral surface.

The invention will now be particularly described, by way of non-limitative example only, with reference to the accompanying drawings, in which:

FIG. 1 is a diagrammatic section of a rotary piston internal combustion engine in accordance with the invention;

FIGS. 2 and 3 are enlarged views of a piston apex and seal for use in the engine shown in FIG. 1;

Figure 3:
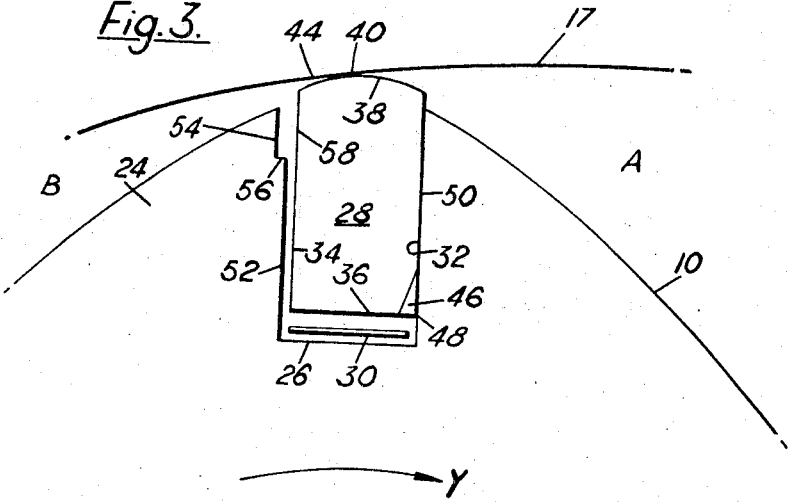
Figure 5:
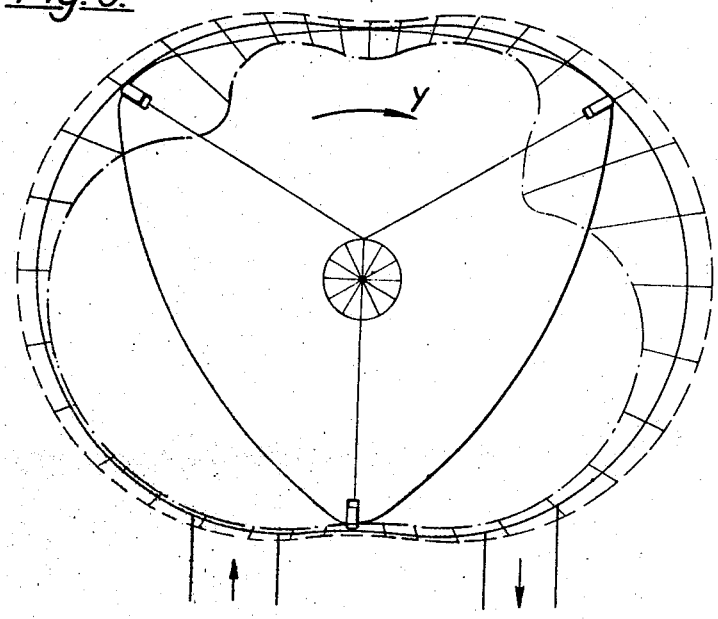
Figure 6:
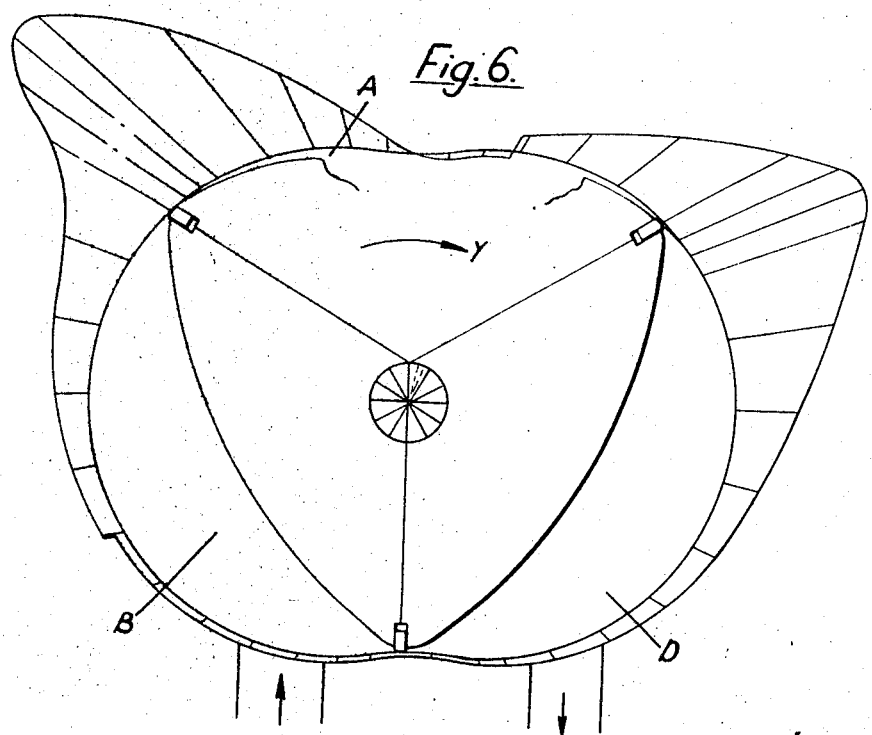

FIGS. 5 and 6 are diagrammatic representations of the forces acting on the seal shown in FIGS. 2 and 3; and FIGS. 7, 8 and 9 are enlarged views of alternative embodiments of the piston apex and seal shown in FIGS. 2 and 3.

In the figures, the normal direction of rotation of the rotary piston is indicated by arrows Y.

In FIG. 1 there is shown a rotary piston internal combustion engine adapted to operate on a compression-ignition cycle, comprising a three-sided piston 10 rotatably mounted on an eccentric 12 provided on a drive shaft 14 which is journalled in side plates (not shown) of a housing 16 having a two-lobed substantially epitrochoidal internal peripheral surface 17. The housing 16 is provided with an inlet port 18 whereby air may enter the housing 16 to be compressed therein by the piston 10, fuel injection means 22 whereby fuel may be injected into the compressed air in the housing 16 so as to initiate combustion, and an exhaust port 20 whereby exhaust gases may be expelled from the housing 16 by the piston 10.

The piston 10 has three apices 24 each provided with an axially extending groove 26 containing a radially movable sealing strip 28. Each sealing strip 28 may be made in one or more parts, extends the full axial width of the piston 10 and is urged into contact with the internal peripheral surface 17 of the housing 16 by a slightly curved leaf spring 30 arranged in a space 31 at the bottom of the groove 26.

An apex 24 of the piston 10 is shown in more detail in FIGS. 2 and 3. The sealing strip 28 has a substantially rectangular cross section, flat leading and trailing sides 32, 34 which respectively face towards and away from the direction of rotation of the piston 10, a flat radially inner surface 36 spaced from the bottom of the groove 26 by the spring 30 and a convexly curved radially outer surface 38 which is urged into contact with the internal peripheral surface 17 of the housing 18. The sealing strip 28 thus separates two working chambers of the engine, which chambers are designated A (adjacent the leading side 32 of the sealing strip 28) and B (adjacent the trailing side 34 of the sealing strip 28).

It will be appreciated that because of the curvature of the radially outer surface 38 of the sealing strip 28 (which curvature, if not initially provided, is rapidly produced in use by wear), there is effectively only line contact, shown at 40, between the sealing strip 28 and the internal peripheral surface 17 of the housing 16. Thus portions 42, 44 of the surface 38 are respectively exposed to fluid in the working chambers A and B.

Figure 4:
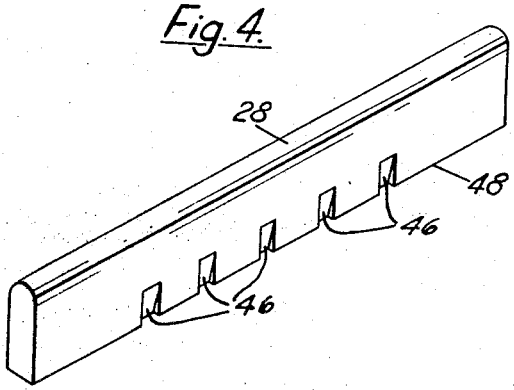
FIG. 4 is a perspective view of the seal shown in FIGS. 2 and 3.

A plurality of slots 46 is provided in the radially inner edge 48 of the leading side 32 of the sealing strip 28. The arrangement of the slots 46 is shown more clearly in FIG. 4.

The groove 26 has leading and trailing walls 50, 52 respectively adjacent the leading and trailing sides 32, 34 of the sealing strip 28, the distance between the walls 50, 52 being slightly greater than the width of the sealing strip 28 between its leading and trailing sides 32, 34; the sealing strip 28 may therefore rock about its axis in the groove 26. A radially outer portion 54 of the trailing wall 52, which portion extends the whole axial length of the groove 26, is recessed so as to form a step 56, thus increasing the width of the radially outer part of the groove 26 and exposing a portion 58 of the trailing side 34 of the sealing strip 28 to the gas in the working chamber B at all times.

In operation, air is supplied to the inlet port 18 and is drawn into, and compressed in, the housing 16 by the piston 10. When the air is fully compressed, fuel is injected into it by the injection means 22, the pressure and elevated temperature of the air serving to initiate combustion. The expanding combustion products drive the piston 10 round until the exhaust port 20 is uncovered, whereupon they are expelled from the housing 16 by the piston 10.

During rotation of the piston 10, the sealing strip 28 is urged radially outwards at all times by the force exerted by the spring 30 and inertial forces, assuming that the spring force is greater than the small inward inertial force which occurs in the regions where the lobes of the housing 16 are joined, and radially inwards at all times by the force exerted by gas pressure in the chamber A on the portions 42 of the surface 38 and by the force exerted by gas pressure in the chamber B on the portion 44 of the surface 38. We have calculated typical values of these outward and inward forces at a number of angular positions throughout one complete revolution of the piston 10, and they are shown plotted radially of the piston 10 in FIG. 5.

However, frictional engagement between the surface 38 of the sealing strip 28 and the surface 17 of the housing 16 tends to rock the sealing strip 28 about its axis into the position, hereinafter referred to as the trailing position, shown in FIG. 2, in which position the trailing side 34 of the sealing strip 28 is in sealing engagement with the edge of the step 56 in the groove 26 and the radially inner edge 48 of the sealing strip 28 abuts the leading wall 50 of the groove 26. When the gas pressure in the working chamber A is greater, or not less by more than a predetermined amount, then the gas pressure in the working chamber B (this occurs, for example, when the working chamber A is at or near minimum volume just prior to or during combustion and the working chamber B is approaching maximum volume just prior to compression or the air therein), the sealing strip 28 takes the trailing position shown in FIG. 2, thereby permitting gas from the working chamber A to enter the space 31 in the groove 26 via the slots 46.

Communication between the space 31 and working the chamber B is prevented by the sealing engagement between the trailing side 34 of the sealing strip 28 and the edge of the step 56 in the groove 26.

The inner surface 36 of the sealing strip 28, which surface is of considerably greater area than the surface 42, is thus subjected to the whole or a considerable proportion of the pressure of the gas in the working chamber A and experiences a radially outwardly directed force greater than the force exerted on the portions 42, 44 of the outer surface 38.

When the gas pressure in the working chamber B exceeds that in the working chamber A by the predetermined amount (this occurs, for example, when the working chamber B is at minimum volume just prior to or during combustion and the working chamber A has just passed maximum volume during the expulsion of the combustion products), the force exerted by gas pressure in the working chamber B on the exposed portion 58 of the trailing side 34 of the sealing strip 28 overcomes the force due to the frictional engagement between the surfaces 38, 17. The sealing strip 28 therefore rocks about its axis in the groove 26 so as to take up the position, hereinafter referred to as the leading position, shown in FIG. 3, thereby permitting gas from the chamber B to enter the space 31 in the groove 26 via the gap between the trailing side 34 of the sealing strip 28 and the trailing wall 52 of the groove 26.

Communication between the space 31 and the working chamber A is prevented by sealing engagement between the leading side 32 of the sealing strip 28 and the leading wall 50 of the groove 26.

The sealing strip 28 thus experiences a radially outwardly directed force as hereinbefore described. We have calculated typical values of the total radial force on the sealing strip 28 at a number of angular positions throughout one complete revolution of the piston 10, assuming that the effective pressure in the space 31 is only two thirds of the pressure in the relevant working chamber, and they are shown plotted radially of the piston 10 in FIG. 6.

It will be appreciated, with reference to FIGS. 5 and 6, that if there is no means for admitting gas from the appropriate working chamber to the space 31, the sealing strip 28 will experience a radially inwardly directed force for a substantial part of each revolution of the piston 10. There will thus be no sealing contact between the surfaces 17, 38 and gas, particularly combustion products, will leak between working chambers, reducing the efficiency of the engine. In the engine of the present invention, however, the resultant radial force on the sealing strip 28 is radially outwardly directed for substantially the whole of each revolution of the piston 10, thus ensuring a good seal between the surfaces 17, 38.

Alternative embodiments of the invention are shown in FIGS. 7, 8, and 9, the same reference numerals being used for parts similar to those shown in FIGS. 1 to 4.

In FIG. 7, the sealing strip 28 is shown with the radially outer portion 58 of its trailing side 34 recessed over its whole length so as to form a step 60, thus decreasing the width of its radially outer part and exposing the recessed portion 58 to the gas in the working chamber B at all times. The operation of this embodiment of the invention is as hereinbefore described, with the exception that when the sealing strip 28 takes the trailing position, the edge of the step 60 sealingly engages the trailing wall 52 of the groove 26 so as to prevent communication between the space 31 and the working chamber B.

Referring to FIG. 8, the radially outer portion 54 of the trailing wall 52 of the groove 26 is removed entirely so as to leave the step 56, i.e. the height of the trailing wall 52 is reduced; the operation of this embodiment of the invention is substantially as hereinbefore described with reference to FIGS. 1–4.

Finally, with reference to FIG. 9, the width of the groove 26 and the width of the sealing strip 28 are both reduced, but the width of the step 56 is increased and the radially outer portion 58 of the trailing side 34 of the sealing strip 28 is constituted by a projecting portion 64 which projects partly over the step 56 so as to leave a clearance. Thus both the radially outer portion 58 of the trailing wall 34 of the sealing strip 28 and the undersurface 66 of the projecting portion 64 are exposed to the gas in the working chamber B at all times. In addition, therefore, to the radial forces due to gas pressure acting on the surface 36 of the sealing strip 28 as hereinbefore described, there is a further force at all times due to the action of the pressure in the working chamber B on the undersurface 66 of the projecting portion 64.

It will further be appreciated that the invention is applicable to rotary piston machines other than rotary piston internal combustion engines, for example rotary piston compressors and expansion machines of the single-lobed epitrochoidal type as disclosed in my British patent specification 1,068,209.

I claim:

1. A rotary piston machine comprising: a housing having an internal peripheral surface, a shaft extending axially of said housing, an eccentric provided on said shaft, a piston rotatable in a planetary fashion within said housing about said eccentric, said piston having in its periphery at least one axially extending groove with a leading wall and a trailing wall, a radially movable sealing member contained within said groove, means urging said sealing member into contact with the internal peripheral surface of said housing to define a trailing working chamber and a leading working chamber, said sealing member having a trailing side and a leading side, said groove having a width measured circumferentially of said piston which permits said sealing member to rock in said groove between a trailing position wherein said trailing side of said sealing member seals with said trailing wall of said groove and wherein fluid from said leading working chamber is admitted to said groove beneath said sealing member but prevented from entering said trailing chamber and a leading position wherein said leading side of said sealing member seals with said leading wall of said groove and where fluid from said trailing working chamber is admitted to said groove beneath the sealing member but prevented from entering said trailing chamber, and said groove having a recess provided in the radially outer portion of the trailing wall so as to increase the width of the radially outer part of the groove over its entire length whereby surface area of the trailing side of said sealing member exposed to fluid in said trailing working chamber is effectively increased when the sealing member is in the trailing position, thereby causing the sealing member to rock from the trailing position to the leading position when a predetermined pressure differential exists between the trailing working chamber and the leading working chamber.

2. A rotary piston machine as claimed in claim 1 wherein the radially outer portion of the sealing member is shaped to extend partly into the recess.

3. A rotary piston machine as claimed in claim 1 wherein at least one slot is provided in the radially inner edge of the leading side of the sealing member, whereby when the fluid pressure in the trailing working chamber does not exceed the fluid pressure in the leading working chamber by the predetermined differential, the sealing member rocks from the leading position to the trailing position in the groove so as to admit fluid from the leading working chamber to the portion of the groove beneath the radially inner surface of the sealing member and to prevent the fluid thus admitted from entering the trailing working chamber.

4. A rotary piston machine comprising: a housing having an internal peripheral surface, a shaft extending axially of said housing, an eccentric provided on said shaft, a piston rotatable in a planetary fashion within said housing about said eccentric, said piston having in its periphery at least one axially extending groove with a leading wall and a trailing wall, a radially movable sealing member contained within said groove, means urging said sealing member into contact with the internal peripheral surface of said housing to define a trailing working chamber and a leading working chamber, said sealing member having a trailing side and a leading side, said groove having a width measured circumferentially of said piston which permits said sealing member to rock in said groove between a trailing position wherein said trailing side of said sealing member seals with said trailing wall of said groove and wherein fluid from said leading working chamber is admitted to said groove beneath said sealing member but prevented from entering said trailing chamber and a leading position wherein said leading side of said sealing member seals with said leading wall of said groove and where fluid from said trailing working chamber is admitted to said groove beneath the sealing member but prevented from entering said trailing chamber, said sealing member having a recess in the radially outer portion of its trailing side so as to reduce the width of the radially outer part of the sealing member over its entire length whereby surface area of the trailing side of said sealing member exposed to fluid in said trailing working chamber is effectively increased when the sealing member is in the trailing position, thereby causing the sealing member to rock from the trailing position to the leading position when a predetermined pressure differential exists between the trailing working chamber and the leading working chamber.

5. A rotary piston machine comprising: a housing having an internal peripheral surface, a shaft extending axially of said housing, an eccentric provided on said shaft, a piston rotatable in a planetary fashion within said housing about said eccentric, said piston having in its periphery at least one axially extending groove with a leading wall and a trailing wall, a radially movable sealing member contained within said groove, means urging said sealing member into contact with the internal peripheral surface of said housing to define a trailing working chamber and a leading working chamber, said sealing member having a trailing side and a leading side, said groove having a width measured circumferentially of said piston which permits said sealing member to rock in said groove between a trailing position wherein said trailing side of said sealing member seals with said trailing wall of said groove and wherein fluid from said leading working chamber is admitted to said groove beneath said sealing member but prevented from entering said trailing chamber and a leading position wherein said leading side of said sealing member seals with said leading wall of said groove and where fluid from said trailing working chamber is admitted to said groove beneath the sealing member but prevented from entering said trailing chamber, and said trailing wall of said groove has a height less than the height of said leading wall of said groove whereby surface area of the trailing side of said sealing member exposed to fluid in said trailing working chamber is effectively increased when the sealing member is in the trailing position, thereby causing the sealing member to rock from the trailing position to the leading position when a predetermined pressure differential exists between the trailing working chamber and the leading working chamber.

References Cited

UNITED STATES PATENTS

| | | |
|---|---|---|
| 2,371,081 | 3/1945 | Tucker et al. 123—8(SS)(UX) |
| 3,171,587 | 3/1965 | Schaller et al. 123—8(SS)(X) |
| 3,182,641 | 5/1965 | Lamm 123—8(SS) |
| 3,196,849 | 7/1965 | Paschke 123—8(SS) |
| 3,204,615 | 9/1965 | Starmuehler 123—8(SS) |
| 3,207,426 | 9/1965 | Gassmann et al. 123—8(SS)(X) |

ALLAN D. HERRMANN, Primary Examiner

U.S. Cl. X.R.

418—61